United States Patent [19]

Ingvarsson

[11] Patent Number: 4,599,843
[45] Date of Patent: Jul. 15, 1986

[54] VEHICLE SAFETY BAR

[75] Inventor: Lars Ingvarsson, Börlange, Sweden

[73] Assignee: Dobel AB, Börlange, Sweden

[21] Appl. No.: 541,339

[22] PCT Filed: Aug. 19, 1982

[86] PCT No.: PCT/SE82/00264
  § 371 Date: Sep. 21, 1983
  § 102(e) Date: Sep. 21, 1983

[87] PCT Pub. No.: WO83/02575
  PCT Pub. Date: Aug. 4, 1983

[30] Foreign Application Priority Data

Feb. 1, 1982 [SE] Sweden ................ 8200530

[51] Int. Cl.$^4$ .......... E04C 3/32; E04C 3/04; E06B 3/00
[52] U.S. Cl. .................. 52/729; 49/501; 52/731
[58] Field of Search .......... 52/729, 731; 49/501; 29/155

[56] References Cited

U.S. PATENT DOCUMENTS

| | | | |
|---|---|---|---|
| 686,817 | 11/1901 | MacPhail | 52/731 X |
| 1,552,474 | 9/1925 | Dornier | 52/731 X |
| 2,098,752 | 11/1937 | Miller | 52/731 X |
| 2,783,718 | 3/1957 | Cheshire | 52/731 X |
| 3,420,016 | 1/1969 | Findlay | 52/731 X |
| 3,700,273 | 10/1972 | Jackson et al. . | |
| 3,791,693 | 2/1974 | Hellriegel et al. . | |
| 4,002,000 | 1/1977 | Howard et al. | 52/729 |
| 4,069,638 | 1/1978 | Hasselqvist et al. | 52/731 X |
| 4,123,183 | 10/1978 | Ryan . | |

FOREIGN PATENT DOCUMENTS

| | | |
|---|---|---|
| 1658664 | 12/1970 | Fed. Rep. of Germany . |
| 2129526 | 12/1972 | Fed. Rep. of Germany . |
| 2319124 | 10/1974 | Fed. Rep. of Germany . |
| 2080201 | 11/1971 | France . |
| 380851 | 11/1975 | Sweden . |
| 386114 | 8/1976 | Sweden . |
| 529886 | 12/1972 | Switzerland . |
| 1587674 | 4/1981 | United Kingdom . |

Primary Examiner—Alfred C. Perham
Attorney, Agent, or Firm—Watson, Cole, Grindle & Watson

[57] ABSTRACT

An elongated safety bar comprises first and second spaced apart flanges and first and second webs which interconnect the associated side edges of the first and second flanges, the second flange, when viewed in cross section, including a flat central portion, and the first flange, when viewed in cross section, including a central portion which is parallel to the flat central portion of said second flange, and opposite generally semicircular end portions, these end portions extending away from the side of an imaginary plane defined by the flat central portion of the first flange opposite the side facing of the second flange. The second flange is longer, viewed in cross section, than the first flange, thus providing the safety bar with a closed, generally trapezoidal-shaped cross section.

10 Claims, 6 Drawing Figures

VEHICLE SAFETY BAR

BACKGROUND OF THE INVENTION

1. Field of the Invention

The present invention relates to a bar, in particular a safety bar for use in vehicles in case of collisions and similar situations. The bar is in the first place intended to be installed in doors for cars, in particular automobiles, in order to absorb forces, e.g., in case of lateral collision between cars and other vehicles.

2. The Prior Art

Hitherto known safety bars in car doors are of tubular design and of circular cross-section. Since in general it is very important to be able to keep down vehicle weights, one tends to design all load-bearing details in cars in such a way as to achieve an optimal relationship between the weight and load-bearing capacity of the component. However, if a collision with a car occurs, it is not only the load-bearing capacity of the component in its initial shape which is of interest but also its load-bearing capacity in the deformed state. The hitherto known circular safety bars have been shown not to offer an optimal ratio between weight and load-bearing capacity. It has also been shown that they gradually lose their load-bearing capacity in step with the deformation of their cross-section, in as much as during this process an indentation is brought about on the load-bearing side of the bar. With an indentation in this side, the bar's capacity to absorb compressive forces in its longitudinal direction is reduced, as a result of which the bar collapses.

SUMMARY OF THE INVENTION

The object of the present invention consists in creating a bar free from the disadvantages characterizing the safety bars hitherto known. This object has been achieved by means of a bar of thin-walled, closed and trapezoidal cross-section, comprising two parallel flanges and two webs inclined in relation thereto. The invention is characterized in that at least one of the flanges is designed with projecting corners which extend along the bar and project from the plane through the flange and away from the bar.

It is certainly generally known how to design, e.g., load-bearing roof plates of so-called trapezoidal section, where the plate ridges are trapezoidal. By comparison with bars in accordance with the invnetion, a bar consisting of a single ridge is, however, open along the wide one of the two parallel sides of the trapeze. If such a bar is loaded at a right angle in respect of its narrow flange, lateral forces occur which form the two inclined webs of the bar. With a bar in accordance with the present invention, the lateral forces are, in the corresponding loading case, balanced, thus bringing about a more advantageous weight/load ratio. The open bar is, in addition, considerably less torsionally rigid than the closed bar.

However, a bar of trapezoidal cross-section has the same disadvantages as, e.g., a bar of circular cross-section, since it buckles on the side on which it is loaded. The load-bearing capacity of the trapezoidal bar is greatest on the side with the narrow flange, but this capacity almost ceases if the narrow flange is buckled inwardly and is accordingly no longer capable of absorbing compressive stresses. A safety bar in, e.g., a car is highly likely to buckle in case of a collision, as a result of which its load-bearing capacity largely ceases. With the present invention, however, at least the narrow flange is therefore designed with projecting corners which extend along the bar and project from the plane through the flange and away from the bar. Owing to these projecting corners the bar is protected against buckling, e.g., in case of a violent collision, in as much as the corners absorb most of the energy which would have buckled the flange of a bar without projecting corners. Thus the corners act as a deformation zone, protecting the flanges of the bar in the same way as, e.g., the front of the car constitutes a deformation zone protecting its passenger compartment. Another advantage of providing the narrow flange with projecting corners consists in that it is possible to ensure thereby that the same amount of material is available on either side of the neutral line of the bar cross-section, which is parallel to the flanges. A disadvantage of the projecting corners consists in the fact that the bar webs are loaded with eccentric forces. This produces a bending moment which initiates bending outwardly as well as buckling of the webs. This disadvantage can, however, be mostly eliminated by not making the webs entirely flat but bending them slightly inward towards the centre of the bar. With very thin sheet this local buckling due to the concentrated load can also be counteracted with the aid of a longitudinal step-like web fold provided at the centre of the webs. This step changes the shape of the buckling waves, thus causing the critical buckling-load to increase.

The strength of bars in accordance with the invention is increased by a production process consisting in that the profile of the bar is produced by so-called roller bending and subsequent straightening, thus bringing about cold working and stretching at each corner of the profile. By roller forming the profile in one piece and welding it together, while at the same time locating the seam preferably at the centre of the narrow and, as a rule, pressure-absorbing flange, tensile stresses are, after straightening, brought about in a narrow flange which, with compressive loading, increases its strength.

The invention is described below with reference to a specific embodiment relating to a safety bar for car doors and in accordance with the attached figures. However, the invention is not limited to safety bars for cars but extends also to bars which may be subject to corresponding violent stress sequences, e.g., protective barriers along roads and in particular bridges.

DETAILED DESCRIPTION OF THE PREFERRED EMBODIMENTS

Figure 1:
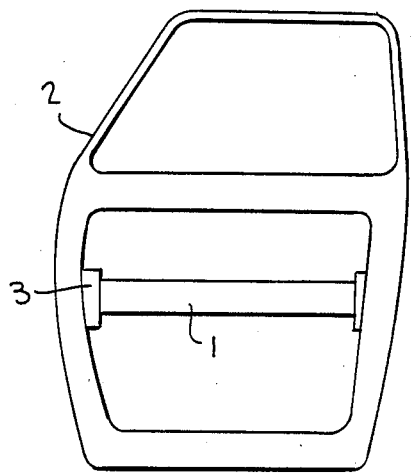
FIG. 1 shows a car door as seen from inside with a safety bar clamped within it.
Figure 2:
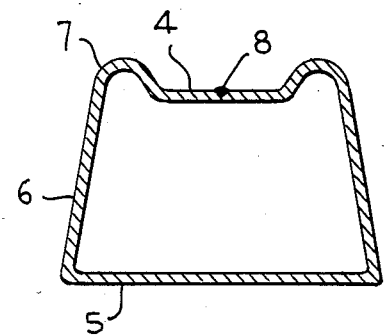
FIG. 2 shows a cross-section of the safety bar in accordance with FIG. 1.
Figure 3:
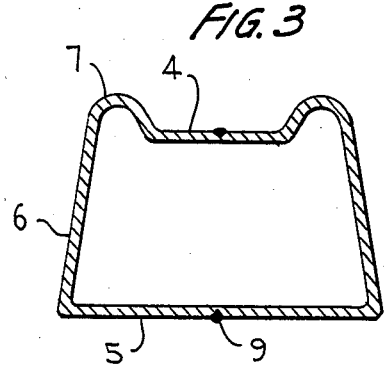
FIGS. 3-6 show alternative cross-sections of safety bars according to the invenion.
Figure 4:
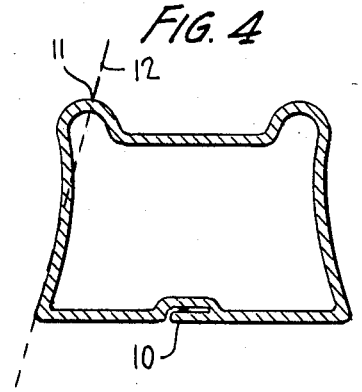
Figure 6:
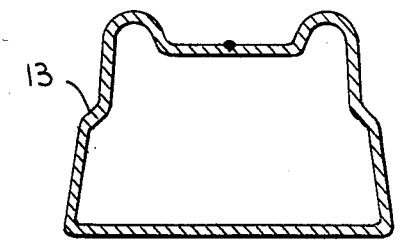

A safety bar 1 consisting of thin steel sheet is, according to FIG. 1, horizontally arranged within a car door 2 with a narrow flange directed towards the outside of the door and flanged at the other end in a mounting 3 at the front or rear edge of the door, respectively. The intention of bar 1 is to protect the passengers in the car against the door 2 being pressed inwardly if a collision occurs with the outside of the door 2. The bar 1 prevents on the one hand the door 2 from being deformed in such a way that parts thereof penetrate into the compartment of the car, and on the other hand prevents the door 2 from detaching itself, in the course of the deformation, from the surrounding frame and being pressed entirely into the compartment. The cross-section of the safety bar, FIG. 2, comprises a narrow flange 4 intended to absorb compressive stresses when loaded from the outside of the door 2, a wide flange 5 parallel to the narrow flange 4 and symmetrical in relation to the narrow flange 4, a line of symmetry constituting a perpendicular in respect of the plane through the narrow flange 4, as well as two bar webs 6 which link the two flanges 4 and 5. The narrow flange 4 is designed with projecting corners 7 which extend along the bar 1 and which project from the plane through the narrow flange 4 and away from the bar 1. The bar profile is brought about by roller forming of a sheet strip, whereby the edges of the strip meet at the centre of the narrow flange 4 where the edges are joined by means of a weld 8. As a result of the welding process, the bar 1 tneds to bend so that the narrow flange 4 develops a concave shape in the longitudinal direction of the bar, and it is for this reason that the bar 1 is straightened after welding. The webs 6 are so arranged as to form an angle of 1°–30°, preferably 1°–10°, in respect of the perpendicular to the plane through the flanges 4 and 5. The webs 6 may be flat between the corners but can also be made slightly concave. In case of a lateral collision, the forces impinge predominantly upon the foremost projecting parts 11 of the corners 7. The lines of force 12 (see FIG. 4) will in this case extend between the foremost projecting parts 11 of the projecting corner 7 and the corner between the web 6 and the wide flange 5 of the safety bar 1, on the same side as the safety bar 1. This brings about a bending moment acting upon the web 6 which tends to bend the latter outwardly. The tendency for this bending of the web 6 can be reduced by making the web 6 from start slightly concave in the direction towards the centre of the safety bar 1, so that as large a part of the web 6 as possible is located within the force lines 12 described above. The thickness of the sheet constituting the bar amounts to 0.5–4.0 mm. With sheet thicknesses close to the lower limit, it is advisable to provide a step 13 in the central region of the webs so as to stabilize them against buckling, FIG. 6. All bending radii at the corner sections are minimal bearing in mind the bendability of the material, i.e., about 2.0 mm. The height of the corner sections 7 is so dimensioned as to bring about a requisite deformation zone with a view to protecting the flat part of the flange 4 which is subject to th compressive stress. The bending radii at the top of the corner 7 are about half the width of th corner 7. In an alternative embodiment of the safety bar, FIG. 3, the cross-sectional profile has been brought about by roller forming two bar halves, which constitute each others mirror image and are joined by a weld 8 in the narrow flange, as well as a weld 9 in th wide flange 5. With an alternative embodiment of a safety bar in accordance with FIG. 4, the cross-sectional profile has been brought about by roller forming of a sheet strip, whereby the edges of the strip have been joined by means of a lockseam 10 at the line of symmetry and within the wide flange 5, which is always exposed to tensile stresses when the narrow seam 4 is subject to pressure.

Figure 5:
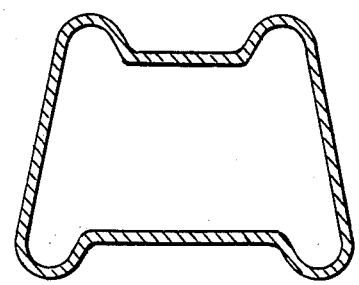

Alternatively also the wide flange 5 can be provided with corners 7, FIG. 5, by way of protection in case of pressure loads if any acting upon this flange, e.g., where bars constitute protective barriers along motor roads, etc.

EXAMPLE

So as to be able to determine the energy absorption capacity of the invention on a laboratory scale and by comparison with a conventional bar, a safety rail 1 in accordance with the invention was produced from 1.60 mm steel sheet with a breaking point of 1000 N/mm$^2$, the dimensions being as follows:

Length of wide flange, 5: 53 mm

Perpendicular distance between the flanges, 5, 4: 28 mm

Angle between the webs, 6, and the wide flange, 5: 32 mm

The webs, 6, were in this example flat between the corners: 7.5°

The weight amounted to 1.8 kg/m.

By way of comparison with the safety bar 1 in accordance with the invention, use was made of a currently conventional safety bar for a modern car, consisting of a circular tube with an outer diameter of 31 mm and a material thickness of 2.6 mm. The tube had been made of a relatively costly grade of steel with a breaking point of 1300 N/mm$^2$. Also this tube weighed 1.8 kg/m. When subject to identical testing, it was found that the safety bar 1 and the tube possessed the same energy absorbing capacity in spite of the fact that the tube had been produced of a far costlier grade with a breaking point 30% higher. A safety bar in accordance with the invention is, in addition, cheaper to form than a tube.

I claim:

1. An elongated safety bar which is resistant to lateral deformation in a collision, said elongated bar including first and second spaced apart flanges which extend the length of said safety bar and first and second webs which extend the length of said safety bar, the first and second webs respectively interconnecting the associated sides of said first and second flanges so as to provide said safety bar with a closed, generally trapezoidal-shaped cross section;

said second flange, when viewed in cross section, defining a flat central portion and opposite end portions;

said first flange, when viewed in cross section, defining a flat central portion and opposite end portions, said central portion of said first flange being parallel to said flat central portion of said second flange, and said opposite end portions of said first flange being generally semi-circular in shape and extending away from an imaginary plane defined by the flat central portion of said first flange on the side thereof opposite the side facing said second flange;

said second flange, when viewed in cross section, being longer than said first flange, such that said first and second webs diverge from one another as they extend from said first flange to said second flange;

said elongated safety bar being resistant to buckling by forces applied against said semi-circular end portions of said first flange and in the general direction of said second flange.

2. An elongated safety bar as defined in claim 1, wherein each of said first and second webs is flat.

3. An elongated safety bar as defined in claim 1, wherein each of said first and second webs is slightly concavely curved.

4. An elongated safety bar as defined in claim 1, wherein the opposite end portions of said second flange are flat and parallel with the flat central portion of said second flange.

5. An elongated safety bar as defined in claim 1, wherein the opposite end portions of said second flange are generally semi-circular in shape and extend away from an imaginary plane formed by the flat central portion of said second flange on the side thereof opposite the side facing said first flange.

6. An elongated safety bar as defined in claim 1, wherein each of said first and second webs includes an outwardly-extending step therein.

7. An elongated safety bar as defined in claim 1, wherein said first flange comprises the opposite side portions of an elongated piece of thin material which has been configured to provide said second flange, said first and second webs and half portions of said first flange, and wherein said opposite side portions include a continuous weld therebetween.

8. An elongated safety bar as defined in claim 1, wherein said first and second flanges comprise associated opposite side portions of two elongated pieces of thin material which have been configured to provide a web and half portions of said first and second flanges, and wherein said associated opposite side portions include continuous welds therebetween.

9. An elongated safety bar as defined in claim 1, wherein said second flange comprises the opposite side portions of an elongated piece of thin material which has been configured to provide said first flange, said first and second webs and half portions of said second flange, and wherein said opposite side portions are shaped to provide an interlocking seam.

10. A car door which includes an elongated safety bar as defined in claim 1.

* * * * *